United States Patent [19]

Maier

[11] 4,237,922
[45] Dec. 9, 1980

[54] IN-LINE FLOW CONTROL VALVE
[75] Inventor: Albin Maier, Edinboro, Pa.
[73] Assignee: Snap-Tite, Inc., Union City, Pa.
[21] Appl. No.: 945,126
[22] Filed: Sep. 25, 1978
[51] Int. Cl.³ ............................................. G05D 7/01
[52] U.S. Cl. .................................. 137/493; 137/501; 251/318
[58] Field of Search ............... 91/443, 447; 137/493, 137/501, 504, 513.7; 251/218-221, 318, 343-346

[56] References Cited
U.S. PATENT DOCUMENTS

| 3,015,341 | 1/1962 | Hedland | 137/493 |
| 3,145,730 | 8/1964 | Presnell | 137/504 X |
| 3,402,735 | 9/1968 | Kates | 137/501 |
| 3,424,196 | 1/1969 | Donner | 137/504 |
| 4,147,179 | 4/1979 | Miura | 91/443 X |

FOREIGN PATENT DOCUMENTS

| 2259868 | 12/1972 | Fed. Rep. of Germany | 251/318 |
| 721031 | 12/1954 | United Kingdom | 137/504 |

Primary Examiner—Robert G. Nilson
Attorney, Agent, or Firm—Woodling, Krost & Rust

[57] ABSTRACT

In-line flow regulator for use in hydraulic flow systems is presented using a fixed size orifice which may be manually adjustable by blocking off a part of the orifice to provide an exact rate of flow in the regulated flow direction and which otherwise provides a free flow in the reverse direction.

4 Claims, 3 Drawing Figures

IN-LINE FLOW CONTROL VALVE

BACKGROUND OF THE INVENTION

The current state of the art in-line flow regulator used has a fixed orifice as the regulating port to control the flow in this valve. This fixed orifice is installed at the factory and can not be changed in the field. Because of this type of installation, the valve must be ordered from the factory stating the flow that you wish to have regulated. The problem with this method of manufacturing the valve is that you must know the actual flow rate that you need and then have the time to wait for the factory to manufacture the valve from scratch. This also means that the distributor will not stock the valves because of the number of different flow rates required and the distributor would have to stock for each of these different flow rates. This method can also be a problem with an end user who did not calculate his flow rate exactly to his requirements, or his requirements changed slightly, therefor requiring a different flow rate than the valve he received. He must now go back through the whole process and reorder a new valve from the factory with a different flow rate he requires. This whole process can be very discouraging to both the distributor, who is trying to supply the valve to the end user, and the end user, who has delivery problems and other problems associated with getting this valve.

SPECIFICATION

An object of this invention is to provide an improvement in an in-line flow regulator for use in hydraulic systems and wherein the regulator may be mounted directly into a hydraulic line of a hydraulic system, and which regulator is manually adjustable to provide an exact rate of flow of hydraulic fluid in the direction of regulated flow.

Other objects and advantages of the invention will be set forth in the specification and as shown in the attached drawings.

FIG. 2 is a central sectional view like FIG. 1 but showing an adjusted position of the flow control ring; while

This invention relates to an improvement in an in-line flow regulator for use in hydraulic systems wherein the regulator may be mounted directly in a hydraulic line of such systems, and which regulator is manually adjustable in the field to provide an exact rate of flow of fluid desired. This feature allows the valve to be adjusted in the field, or at the factory, to give the exact flow rate which the customer requires. This is done with one design of the valve for each of a range of flows. This concept allows the distributor to stock one in-line flow regulator and which can be adjusted for any flow regulation within the range either by an adjustment of the flow control ring by the distributor or by the end user. This overcomes the prior objection where a user had to go back to the manufacturer for a redesign of a valve in case the user needs a little more flow or a little less flow than originally calculated.

Figure 1:
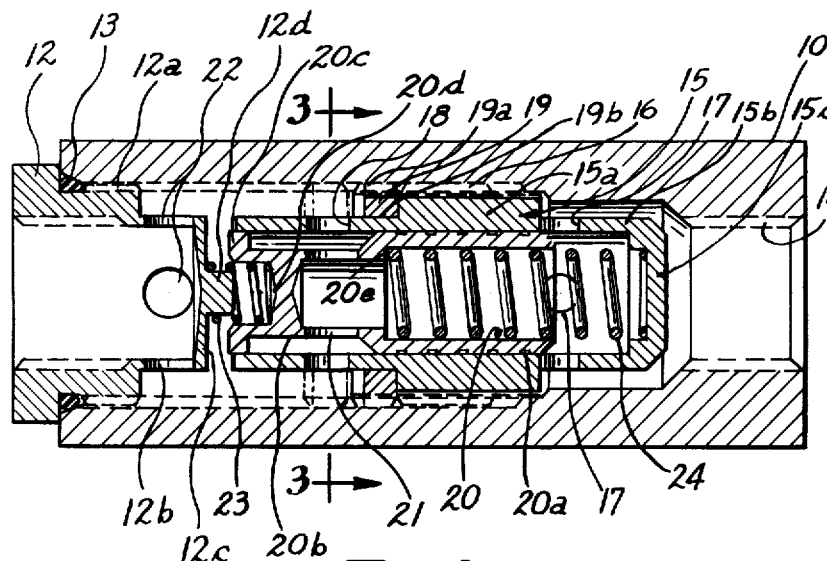
FIG. 1 is a central section through an in-line flow regulator presented in the present specification and indicating an annular flow control ring for adjusting the size of opening of the fixed flow orifice, and indicating the movement for adjustment of the flow control ring from a completely open orifice in full lines to a completely blocked orifice in dot-dash lines.
Figure 3:
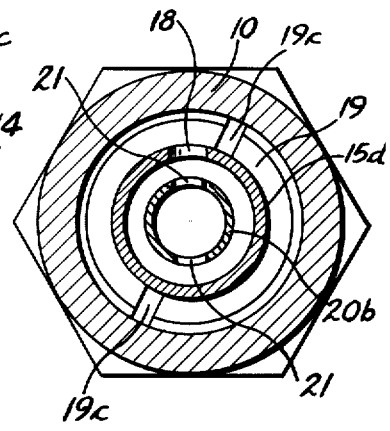
FIG. 3 is a sectional view taken along the line 3—3 of FIG. 1.
Figure 2:
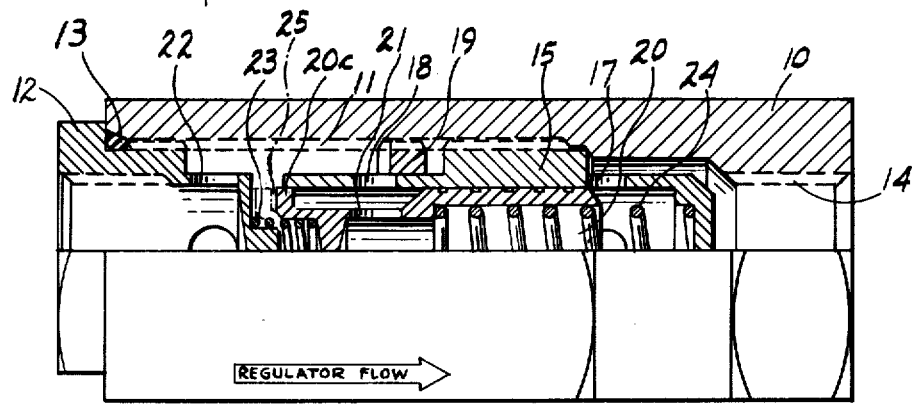

In the drawings, a main housing 10 is shown having a through opening extending concentrically therethrough from end to end. This housing is so designed that it may be mounted in an hydraulic system flow line of the user. A thread 11 is provided on the radially inner wall of the housing into which certain portions of the structure are threaded. One end of the housing is normally closed by an inlet and an exhaust adapter plug threaded at 12a into the housing with the opening sealed by a flexible seal 13. The other end of the housing remains open at 14. A subhousing 15 is generally cylindrical and has a midportion 15a of a greater diameter which is threaded at 16 into the main housing. One end of the subhousing at 15b is of lesser diameter than the midportion 15a and is closed at the end of the subhousing at 15c. One or more flow openings 17 are provided in this end portion of the subhousing. The other end of the subhousing at 15d is cylindrical as shown in FIGS. 1 and 2. A single fixed size orifice 18 is provided in this part of the subhousing.

This invention provides an annular flow control ring 19 which has threads 19a on its radially outer periphery to engage with the threads 11 on the main housing 10. The inner diameter of the flow control ring 19b has a sliding fit on the cylindrical end portion 15d of the subhousing. It is possible to have the threads on portion 15d and the fit on housing 10.

The threads 19a and 11 provide means to manually move the flow control ring 19 axially of the housing and subhousing between a possible fully opened position shown in the full lines in FIG. 1 or otherwise to a fully closed position as shown in dot-dash lines in FIG. 1.

A hollow spool piston 20 is concentric in the subhousing 15 and extends along the midportion 15a and the cylindrical end portion 15d. Sealing means is provided between the spool piston and the subhousing 15 as indicated at 20a. The spool piston is reduced in diameter toward the adapter end of the device as indicated at 20b. One or more flow openings 21 are provided through the walls of this portion 20b. At the adapter end of the spool piston, the entire peripheral end is flanged radially outwardly as shown at 20c so as to meet and substantially seal against the radially inner wall of the spool piston cylindrical portion 15d at its normally open end.

The adapter 12 has an axially inner end 12b radially spaced inwardly from the housing 10 and is closed across its axially inner end as indicated at 12c. One or more flow openings 22 are provided in this inner end of this adapter.

A short compression spring 23 is held between an extention 12d on the adapter and a recess 20d on the spool piston.

Another compression spring 24, of greater force than the spring 23, is held between the closed end 15c of the subhousing and a shoulder 20e on the spool piston.

It will be seen in the drawings, that diametrically opposed radial slots 19c are provided in the flow control ring 19 on the face thereof toward the adapter end. In assembling the parts before use, with the adapter 12 out of position, the subhousing 15 is first screwed into position as shown in FIGS. 1 and 2, the spool piston 20 and compression spring 17 are assembled as shown, and then the adapter ring 19 is screwed into position using a spanner wrench from the left hand end of the housing 10 as shown in FIGS. 1 and 2. The position of the flow control ring, for a given user, will be carefully set in a position similar to that illustrated in FIG. 2. Then the adapter 12, with compression spring 23 in position, will be screwed into the open end at the left end of FIGS. 1 and 2 and sealed as with an O-ring indicated at 13.

With the parts in position like that shown in FIG. 2, the operation of the invention is as follows. For flow of the hydraulic fluid in a regulated flow direction, that is, from left to right in FIGS. 1 and 2, the hydraulic fluid will enter the adapter 12, pass through the openings 22, then pass through the controlled orifice 18, then through the first flow opening means 21, then through the spool piston and radially outwardly out through the second flow opening means 12, and thence out the open end 14 at the right hand end of the housing 10 as seen in FIGS. 1 and 2.

Reverse flow would be from the hydraulic system connected into the housing 10 at the right hand end as seen in the drawings. The flow will be through the open end of the housing 14, through the second flow opening means 17 into spool piston 20, whereupon pressure on the closed end of the spool piston will push the spool piston toward the left as viewed in FIGS. 1 and 2, thus causing an annular opening 25 between the flange 20c of the spool pistion and the cylindrical wall 15d of the subhousing, then the flow will be through openings 22 and out the open end of the adapter 12. It should also be understood that some of the reverse flow will be through whatever portion of the orifice 18 is still in open position, escaping beyond the flow control ring 19.

What is claimed is:

1. A fixed flow in-line regulator adapted to be mounted directly in a hydraulic flow line, comprising a hollow housing, an inlet and exhaust adapter mounted in one end of said housing and said housing being open at its other end, said adapter having an inner end radially spaced from said housing and closed at its axial inner end, there being flow openings in said adapter inner end, a fixed hollow subhousing concentric in a midportion of said housing, said subhousing having a midportion and an end portion, said subhousing joined substantially at its said midportion to said housing with said end portion extending away from said adapter end of said housing, said end portion of said subhousing being closed, said end portion of said subhousing radially spaced from said housing and having a first flow opening means therein, said subhousing having a cylindrical portion extending toward said adapter, there being a control flow opening of fixed size in said cylindrical portion, an annular flow control ring axially movable between surrounding parts of said cylindrical portion and said housing, said ring having a threaded connection with one of said surrounding parts and having a sliding fit upon the other of said parts for movement toward and away from adjustable positions over said control flow opening, a hollow spool piston concentric in said subhousing and extending along its midportion and cylindrical portion, the end of said spool piston being normally closed across said cylindrical portion at one end and being open at its opposite end, there being second flow opening means extending radially through said spool piston near its closed end, compression spring means held between said closed subhousing end and said spool piston, said spool piston being slidable longitudinally of said subhousing to cause an annular opening between said spool piston closed end and said cylindrical portion of said subhousing, and a compression spring held between said adapter and said spool piston, whereby for regulated flow the hydraulic liquid will flow into one end of said housing through said adapter and through said control flow opening and through said second flow opening means and through said hollow spool piston and through said first flow opening means and through said housing open end, and reverse flow would be in the opposite directions through said first and second flow opening means sliding said spool piston toward said adapter end causing said annular opening for free flow on through the adapter and out of the housing.

2. A fixed flow in-line regulator as defined in claim 1, wherein said flow control ring is movable between fully closed and fully open positions of said control flow opening.

3. A flow regulator adapted to be connected in a fluid flow line including in combination a housing having a wall defining an axially extending opening therethrough, a subhousing mounted in said opening in said housing and having an annular wall spaced from said first named wall, said annular wall defining an axially extending opening in said subhousing and an opening in a normally downstream end portion thereof, a flow orifice extending radially through said annular wall and providing fluid communication between said axially extending openings in said housing and said subhousing, a ring member closely surrounding said annular wall and movable axially thereon relative to said flow orifice, said ring member threadably connected to one of said first named wall and said annular wall which provides for said axial movement thereof relative to said flow orifice to cover a portion thereof and thereby determine flow through said flow orifice.

4. The structure of claim 3 characterized by the addition of another flow orifice through said annular wall of said subhousing, a piston being normally disposed within said subhousing on a normally upstream portion thereof and being movable in a normally upstream direction against a bias means so as to allow free fluid flow through said another flow orifice when the fluid flow is in an upstream direction.

* * * * *